United States Patent [19]

Gibler et al.

[11] Patent Number: 5,143,990
[45] Date of Patent: Sep. 1, 1992

[54] TERMINATION OF ANIONIC POLYMERIZATION USING HYDROGEN

[75] Inventors: Carma J. Gibler, Houston; Linda R. Chamberlain, Richmond; Thomas F. Brownscombe, Houston, all of Tex.

[73] Assignee: Shell Oil Company, Houston, Tex.

[21] Appl. No.: 522,693

[22] Filed: May 14, 1990

[51] Int. Cl.$^5$ ................................................ C08F 2/38
[52] U.S. Cl. ........................................ 526/82; 526/173; 528/483
[58] Field of Search ................... 526/82, 173; 528/483

[56] References Cited

U.S. PATENT DOCUMENTS

| | | | |
|---|---|---|---|
| 3,352,934 | 11/1967 | House et al. | 526/173 |
| 3,520,858 | 7/1970 | Bodnar et al. | 260/83.7 |
| 3,644,567 | 2/1972 | Smith et al. | 260/829 |
| 3,957,914 | 5/1976 | Baumgartner | 526/82 |
| 4,156,673 | 5/1979 | Eckert | 260/33.6 AQ |
| 4,284,741 | 8/1981 | Uraneck et al. | 525/297 |

FOREIGN PATENT DOCUMENTS

| | | |
|---|---|---|
| 1243702 | 6/1969 | United Kingdom. |
| 1539905 | 7/1976 | United Kingdom. |
| 2118952 | 4/1983 | United Kingdom. |

Primary Examiner—Joseph L. Schofer
Assistant Examiner—Tom Weber
Attorney, Agent, or Firm—Donald F. Haas

[57] ABSTRACT

This is an improvement upon a process which comprises anionically polymerizing monomers with an anionic polymerization initiator in a suitable solvent thereby creating a living polymer. The improvement comprises terminating the polymerization by the addition of hydrogen which reacts with the living polymer to terminate the polymer chain.

23 Claims, No Drawings

TERMINATION OF ANIONIC POLYMERIZATION USING HYDROGEN

BACKGROUND OF THE INVENTION

This invention relates to an improvement in the long used method of making block copolymers from conjugated diolefins and/or alkenyl aromatic hydrocarbons. The improvement comprises utilizing hydrogen gas to terminate the anionic polymerization.

Anionic polymerization utilizing organo alkali metal initiators has long been used to polymerize conjugated diolefins such as butadiene and isoprene and to copolymerize such diolefins with styrene and substituted styrenes to make styrene-butadiene-styrene (S-B-S) and styrene-isoprene-styrene (S-I-S) block copolymers and similar block copolymers. The reaction of these latter block copolymers is used below for exemplary purposes. This reaction is usually carried out in an inert hydrocarbon solvent such as cyclohexane or toluene and it is necessary to rigorously exclude oxygen, water or any impurity that can react with the highly reactive propagating species. Under these conditions the polymeric molecular weights can be precisely controlled. The preferred initiators are organolithiums, although others can be used. Two commonly used methods are:

1. Sequential. i.e., start polymerization at one end of the molecule and continue to the other.
2. Coupling. i.e., start polymerization at each end of the molecule and then join the reactive chains together by a coupling or a linking agent.

In these polymerization methods, sec-butyl lithium is the preferred initiator because it initiates the polymerization very readily. That is to say, the rate of the initiation reaction is high compared to that of the subsequent polymerization. This initiator first reacts with one molecule of styrene monomer. This is known as the initiation reaction.

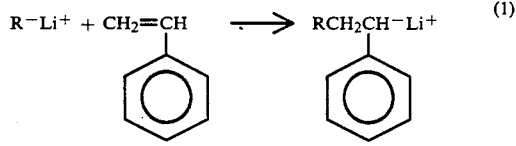

(1)

The product can then continue polymerization of the styrene and this is known as the propagation reaction.

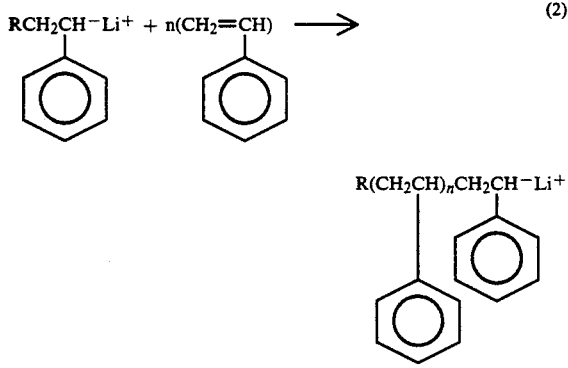

(2)

The new end product is termed polystyryl lithium (the effects of the terminal sec-butyl radical are ignored) and it is denoted as $S^-Li^+$. If a diene (in this case butadiene) is added, the $S^-Li^+$ can initiate further polymerization:

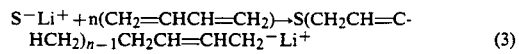

(3)

For the above reaction the product is denoted $S-B^-Li^+$. It also is an initiator, so that if more styrene monomer is now added, it will polymerize onto the "living" end of the polymer chain:

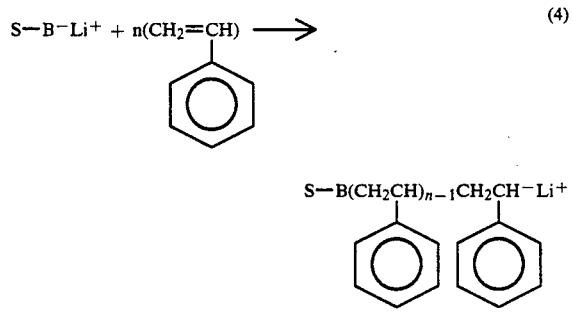

(4)

When this last reaction is complete, the product (S—B—S$^-$Li$^+$-polystyryl lithium) can be inactivated by the addition of a protonating species such as an alcohol. This terminates the reaction:

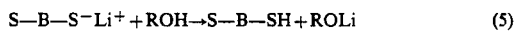

(5)

If the polymer is to be made by coupling, the first three reactions shown above are unchanged, but instead of the $S-B^-Li^+$ initiating further polymerization of styrene, in this case it is reacted with a coupling agent:

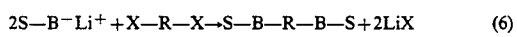

(6)

Many coupling agents have been described, including esters, organohalogens and silicon halides. The example above shows the reaction of difunctional coupling agents but those of higher functionality (for example SiCl$_4$) can also be used and give branched or star-shaped molecules (S—B)$_n$x. There are cases whereby the coupling agent is not incorporated in the polymer. If divinyl benzene is added at the end of the reaction the products are highly branched, i.e., the value of n is very large. This reaction can also be terminated with an alcohol. It is necessary to terminate the living polymer to prevent crosslinking and unwanted coupling reactions, and hence formation of high molecular weight polymer.

The use of alcohol results in formation of alkali metal alkoxides and excess alcohol impurities. The excess alcohol and alkali metal alkoxides adversely affect the activity of some hydrogenation catalysts in the downstream hydrogenation step should hydrogenation of the polymer be desired. Additionally, residual alcohol in the polymerization reactor deactivates part of the living polymer in the next batch which can lead to poor molecular weight control through the formation of intermediate molecular weight material and/or polystyrene homopolymer. Also, in using methanol as a polymerization termination agent it is required that the majority of methanol be removed from recycled solvents creating waste effluent which must be disposed of. Thus, there is a need for a method of terminating the polymerization of these living polymers which would not result in the formation of alkali metal alkoxides and excess alcohol in the system. The termination step of the present invention is clean and efficient, and produces an impurity free polymer cement.

SUMMARY OF THE INVENTION

The present invention provides a solution to the problems of polymerization termination using alcohols. The invention is an improvement upon the process for making polymers of any anionically polymerizable monomer, especially conjugated diolefins and particularly copolymers of conjugated diolefins and alkenyl aromatic hydrocarbons, which comprises anionically polymerizing the monomers with an organo alkali metal polymerization initiator in a suitable solvent thereby creating a living polymer. The improvement comprises terminating the polymerization by the addition of hydrogen which reacts with the living polymer to end the polymer chain. It is preferred that the alkali metal initiator be an organo lithium compound and, in most cases, the preferred organo lithium compound is sec-butyl lithium.

DETAILED DESCRIPTION OF THE INVENTION

Any anionically polymerizable monomer which forms an anion strong enough to react with hydrogen should be effective in this invention. Particular monomers which can be used include acrylamides, acrylonitriles, nitrobutene, vinylisocyanate, methacrylates, including methyl methacrylate, alkyl and aryl acrylates, vinyl pyridines, carbodiimides, lactams, dienes and styrene and styrene derivatives including alkylstyrenes, halogenated methoxy styrenes and nitrostyrene, as well as 1,3-pentadiene and 1,3-octadiene.

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block, star, radial or a combination of these. When the double bonds in the polyolefin are separated by three or more carbon atoms, the ethylenic unsaturation incorporated into the polymer will be contained in a branch extending outwardly from the main polymer chain but when the polyolefin is conjugated at least a portion of the ethylenic unsaturation incorporated into the polymer may be contained in the polymer backbone.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, anionically polymerizable monomers including conjugated diolefin polymers and copolymers of conjugated diolefins and alkenyl aromatic hydrocarbons are prepared by contacting the monomer or monomers to be polymerized simultaneously or sequentially with an anionic polymerization initiator. Such initiators include Group IA metals, their alkyls, amides, silanolates, naphthalides, biphenyls and anthracenyl derivatives. It is preferred to use an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like; ketones such as methyl ketone (acetone), methyl ethyl ketone, ethyl ketone (3-pentanone) and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be treated in accordance with this invention also include block copolymers such as those described in U.S. Pat. Nos. 3,231,635; 3,265,765 and 3,322,856, the disclosure of which patents are also incorporated herein by reference. In general, linear and branched block copolymers which may be treated in accordance with the present invention include those which may be represented by the general formula:

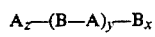

Wherein:

A is a linear or branched polymeric block comprising predominantly monoalkenyl aromatic hydrocarbon monomer units;

B is a linear or branched polymeric block containing predominantly conjugated diolefin monomer units;

x and z are, independently, a number equal to 0 or 1;

y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x-(A-B)_y-A_z]_n-C-P_{n'}$$

Wherein:

A, B, x, y and z are as previously defined; n and n' are, independently, numbers from 1 to about 100 such that $n+n' \geq 3$;

C is the core of the coupled or radial polymer formed with a polyfunctional coupling agent; and Each P is the same or a different polymer block or polymer segment having the general formula:

$$B'_{x'}-(A'-B'')_{y'}-A''_{z'}$$

Wherein:

A'' is a polymer block containing predominantly monoalkenyl aromatic hydrocarbon monomer units;

B' is a polymer block containing predominantly conjugated diolefin monomer units;

A'—B'' is a polymer block containing monoalkenyl aromatic hydrocarbon monomer units (A') and conjugated diolefin monomer units (B''), the A'—B'' monomer units may be random, tapered or block and when A'—B'' is block, the A' block may be the same or different from A'' and B'' may be the same or different from B';

x' and z' are, independently, numbers equal to 0 or 1; and y' is a number from 0 to about 15, with the proviso that the sum of $x'+y'+z \geq 1$. The radial polymers may, then, be symmetric or asymmetric.

In the production of all of the polymers described above, the polymerization may be terminated by utilizing hydrogen or its isotopes (i.e. deuterium) in place of the conventionally used alcohol terminating agent. The living polymer, or more accurately, the living end of the polymer chain, is terminated by the addition of hydrogen thereto. This termination reaction takes place instead of reaction number (5) shown above. Using an S—B—S block copolymer for exemplary purposes, it is theorized that the reaction is as follows:

$$S-B-S^-Li^+ + H_2 \rightarrow S-B-SH + LiH \quad (7)$$

As shown above, lithium hydride may be formed during the termination process. It is not expected to be a reactive polymerization initiator. It is inert toward anionic polymerization and will not interfere with the molecular weight control of the next polymerization batch as alcohol can.

It is usually advisable to contact and vigorously mix hydrogen with the polymerization solution at the end of the polymerization reaction. This contact can be effected by adding the hydrogen gas through spargers in a mixing vessel containing polymer solution. The time of contact should be at least about ten seconds and preferably about twenty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solution and added to the polymer solution to be terminated. Another method would be to cause hydrogen to be absorbed into an absorption bed and then causing the unterminated polymer cement to flow through absorption beds containing hydrogen. The hydrogen contact could be carried out by adding a material which gives off hydrogen when it decomposes (i.e. diimide).

When this improvement is used, the problems of using alcohol, i.e. the formation of lithium alkoxides and excess alcohol impurities, are avoided. However, the advantages of polymer termination by the alcohol method are obtained.

EXAMPLES

Homopolybutadiene, homopolyisoprene, polyisoprene-polystyrene and polystyrene-polybutadiene-polystyrene block copolymers were terminated with hydrogen. Typically, at the end of the polymerization reaction, the living polymer cement was sparged with hydrogen gas (1.0 SCFM) from 5 to 60 minutes and vigorously mixed. Generally, the temperature of the polymer cement was 60° C. and no increase in temperature was observed during the termination step. During the sparging stage of the reaction, the total pressure in the reactor ranged from 40 to 100 psig of hydrogen. Termination was confirmed by four independent methods. The first of these was a simple colorimetric examination of the polymer cement. Styryllithium living ends have an absorption maximum at 328 mμ and thus have a distinct orange color which turns colorless when the living ends are terminated. This was observed in hydrogen termination as samples were pulled from the reactor and visually, as well as colorimetrically, examined for color change. The second method for determining termination was gel permeation chromatography (GPC). Analysis of the hydrogen terminated polymers by GPC showed that there was no high molecular weight polymer (HMP) formed. The absence of HMP generally indicates that the polymer has not crosslinked. Crosslinking is a typical detrimental side reaction in non-terminated polymer cements. Another method used to verify termination was $^2$H NMR. Deuterium gas was used to terminate the living polymer. During the termination, samples were drawn from the reactor and subsequently submitted for NMR analysis. Polymer termination was essentially complete when there was no increase in deuterium incorporation in the polymer. The fourth method employed involved adding styrene monomer back to the terminated polymer. If any living ends are still existing after the sparge, they will polymerize the added monomer.

EXAMPLE 1

Polybutadiene Terminated With Hydrogen

A 34,400 molecular weight polydiene polymer (B⁻Li⁺) was made by anionic polymerization using sec-butyllithium as the initiator in a two gallon autoclave. The polymerization took place in a mixture of cyclohexane and diethyl ether. The resulting polymer solution contained 20% polymer by weight.

At the end of the polymerization reaction, the polymer solution was transferred to another reactor containing 1500 g of hydrogen-sparged cyclohexane. This resulting solution contained 15% polymer. This solution was sparged with hydrogen for 5 minutes. The reactor temperature was approximately 50° C. The reactor pressure was 40 psig and the hydrogen sparge rate was 1.0 SCFM.

The absence of HMP (high molecular weight polymer at greater than 34,400 molecular weight) in the gel permeation chromatography (GPC) can be used as supporting evidence to show that the run has been terminated. A non-terminated polymer could cross-link or air-couple to form HMP. The HMP peak was relatively small and typical for a terminated polymer.

EXAMPLE 2

S—B—S Polymer Terminated With Deuterium

A styrene-butadiene-styrene (S—B—S⁻Li⁺) block copolymer 41,100 molecular weight was made by anionic polymerization using sec-butyllithium as the initiator in a two gallon autoclave. The polymerization took place in a mixture of cyclohexane and diethyl ether. The resulting polymer solution contained 20% polymer by weight.

This solution was sparged with deuterium for 15 minutes. Deuterium was selected so that the deuterium concentration in the polymer could be measured over time using $^2$H NMR. The expected reaction follows:

$$S-B-S^-Li^+ + D_2 \rightarrow S-B-S-D + LiD$$

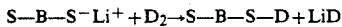

The reactor temperature was approximately 50° C. The reactor pressure was held at 95 psig while sparging with deuterium. Samples were taken at 5, 10 and 15 minutes during the termination reaction. The orange styryllithium color was present in the 5 minute sample, but not the 10 minute sample indicating that termination occurred before 10 minutes.

The samples were then prepared by drying in a vacuum oven to remove the solvent. Deuterium concentrations were measured on the dried samples by $^2$H NMR. Refer to Table I. The deuterium concentration increased and then leveled out after 10 minutes indicating that deuterium incorporation, i.e., termination, was achieved within 10 minutes.

EXAMPLE 3

Polydiene Terminated With Deuterium

A 67,300 molecular weight polybutadiene polymer (B⁻Li⁺) containing 3% styrene randomly distributed was made by anionic polymerization using sec-butyllithium as the initiator in a two gallon autoclave. The polymerization took place in a mixture of cyclohexane and diethyl ether. The resulting polymer solution contained 20% polymer by weight.

This solution was terminated in the same manner as Example 2 by sparging with deuterium for 15 minutes.

The reactor temperature was approximately 70° C. The reactor pressure was held at 95 psig while sparging with deuterium. Samples were taken at 5, 10 and 15 minutes during the termination reaction.

The samples were then prepared by drying in a vacuum oven to remove the solvent. Deuterium concentrations were measured on the dried samples by $^2$H NMR. Refer to Table I. The deuterium concentration increased and then leveled out after 10 minutes indicating that the polymer was terminated within 10 minutes.

TABLE I

| | Deuterium Results | |
| --- | --- | --- |
| | Example 2<br>S-B-S<br>(micrograms/gram) | Example 3<br>Polybutadiene<br>(micrograms/gram) |
| 0 min. Sample | 27 | 23 |
| 5 min. Sample | 69 | 48 |
| 10 min. Sample | 79 | 60 |
| 15 min. Sample | 82 | 59 |

EXAMPLE 4

S—B—S Polymer Terminated With Hydrogen

A 600 lb batch of styrene-butadiene-styrene (S—B—S⁻Li⁺) block copolymer 50,000 molecular weight was made by anionic polymerization using sec-butyllithium as the initiator in a 150 gallon reactor. The polymerization took place in a mixture of cyclohexane and diethyl ether. The resulting polymer solution contained 20% polymer by weight.

At the end of the polymerization reaction, the reactor temperature was approximately 60° C. The reactor was sparged with hydrogen through the sample port for approximately 20 minutes. A colorimeter was used to determine when the termination was complete since S—B—S⁻Li⁺ has a distinct orange color. The colorimeter reading still showed "color" after 15 minutes of sparge time. At that time, the vent was closed and the reactor pressured up to 80 psig with hydrogen. The temperature was raised to decrease viscosity and improve mass transfer. The solution was mixed for 20 more minutes under 80 psig of H$_2$. During that time, the colorimeter reading dropped to baseline which reflects a terminated S—B—S—H polymer.

EXAMPLE 5

I—S Polymer Terminated with Hydrogen

An isoprene-styrene (I—S—Li⁺) block copolymer 98,300 molecular weight was made by anionic polymerization using sec-butyllithium as the initiator in a 150 gallon reactor. The polymerization took place in cyclohexane and the resulting polymer solution contained 20% polymer by weight.

At the end of the polymerization reaction, the reactor temperature was approximately 60° C. The reactor was vented and repressured to 60 psig with hydrogen. The reactor was allowed to mix for 120 minutes. During that time, the colorimeter reading dropped to the baseline which reflects a terminated I—S—H polymer.

EXAMPLE 6

I—S Polymer Terminated with Hydrogen

An isoprene-styrene (I—S—Li⁺) block copolymer 131,700 molecular weight was made by anionic polymerization using sec-butyllithium as the initiator in a 150 gallon reactor. The polymerization took place in cyclohexane and the resulting polymer solution contained 20% polymer by weight.

At the end of the polymerization reaction, the reactor temperature was approximately 60° C. The reactor was vented and repressured to 25 psig with hydrogen. The reactor was then heated to 70° C. and mixed for 15 minutes. Samples were taken and visually checked for color. The colorless material indicated that the polymer had been terminated after the 15 minutes.

EXAMPLE 7

Polyisoprene Polymer Terminated with Hydrogen

A 44,300 molecular weight polyisoprene (I—Li+) was made by anionic polymerization using sec-butyl lithium as the initiator. The polymerization took place in cyclohexane and the resulting polymer solution contained 20% polymer by weight.

At the end of the polymerization reaction, the reactor temperature was was approximately 60° C. The reactor was vented and hydrogen gas was admitted to the reactor at a rate sufficient to maintain 35-40 psig hydrogen in the reactor. The cement was sparged for 1 hour, then allowed to stand overnight with a 40 psig hydrogen cap. Samples were drawn into nitrogen sparged 4 ounce sample bottles containing styrene at 10, 25, and 60 minutes. For each sample, the amount of monomer consumed (added polymer growth) was measured by gel permeation chromotagraphy (GPC). For the 60 minute sample, the GPC showed no new monomer growth indicating termination.

EXAMPLE 8

A 600 lb. batch of polystyrene-polybutadiene-polystyrene (S—B—S—Li+) block copolymer, 22,000 molecular weight, was made by anionic polymerization using sec-butyl lithium as the initiator in a 150 gallon reactor. The polymerization took place in a mixture of cyclohexane and diethyl ether. The resulting polymer solution contained 20% polymer by weight.

At the end of the polymerization rection, the reactor temperature was approximately 60° C. The reactor was sparged with hydrogen through the sample port for approximately 15 minutes. The pressure of the hydrogen varied from 10 to 80 psig. After this time, additional styrene monomer was added to the reactor to determine the extent to which active living lithium ends were still intact, i.e. those that will polymerize the added monomer. A sample was removed from the reactor at the 15 minute mark and terminated via the traditional alcohol addition. The amount of monomer consumed (added polymer growth) was measured by gel permeation chromotagraphy (GPC). The monomer growth indicated that 90% of the polymer was terminated at 15 minutes of hydrogen sparging.

EXAMPLE 9

The same procedure was followed as in Example 8 except the hydrogen addition time was increased to 30 minutes. The pressure of hydrogen varied from 10 to 80 psig. The temperature was 60° C. After 30 minutes, styrene monomer was added to the reactor. A sample was removed from the reactor and terminated via traditional alcohol addition. Gel permeation chromotagraphy analysis showed no new monomer growth indicating that the living ends of the polymer were totally terminated with 30 minutes of hydrogen sparging.

We claim:

1. In a process for anionically polymerizing monomers with an organoalkali metal anionic polymerization initiator in a suitable solvent thereby creating a living polymer, the improvement which comprises terminating the living polymer at the end of the polymerization by the addition of a material selected from the group consisting of hydrogen and its isotopes.

2. The proces of claim 1 wherein the organo alkali metal initiator is an organo lithium compound.

3. The process of claim 2 wherein the organo lithium compound is sec-butyllithium.

4. The process of claim 1 wherein the monomer to be polymerized is selected from the group consisting of acrylamides, acrylonitriles, nitrobutenes, vinyl isocyanates, acrylates, methacrylates, vinyl pyridenes, carbodiimides, lactams, dienes, styrene, styrene derivatives and 1,3-octadiene.

5. The process of claim 4 wherein the organo alkali metal initiator is an organo lithium compound.

6. The process of claim 5 wherein the organo lithium compound is sec-butyllithium.

7. The process of claim 1 wherein the monomer to be polymerized is a conjugated diolefin.

8. The process of claim 7 wherein the organo alkali metal initiator is an organo lithium compound.

9. The process of claim 8 wherein the organo lithium compound is sec-butyllithium.

10. The process of claim 7 wherein the conjugated diolefin is selected from the group consisting of butadiene and isoprene.

11. The process of claim 1 wherein the monomers to be polymerized are conjugated diolefins and alkenyl aromatic hydrocarbons.

12. The process of claim 11 wherein the organo alkali metal initiator is an organo lithium compound.

13. The process of claim 12 wherein the organo lithium compound is sec-butyllithium.

14. The process of claim 11 wherein the conjugated diolefins are selected from the group consisting of butadiene and isoprene and the alkenyl aromatic hydrocarbons are selected from the group consisting of styrene and styrene derivatives.

15. The process of claim 1 wherein the hydrogen contacts the polymer for at least about 20 minutes.

16. The process of claim 1 wherein the hydrogen addition is carried out by sparging the polymer solution with hydrogen.

17. The process of claim 1 wherein the hydrogen addition is carried out by dissolving hydrogen in a solution and then contacting the hydrogen solution with the polymer solution.

18. The process of claim 1 wherein the hydrogen addition is carried out by causing hydrogen to be absorbed into an absorption bed and then causing the polymer solution to flow through the absorption bed.

19. The process of claim 1 wherein the reaction temperature is about 0°-200° C.

20. The process of claim 19 wherein the reaction temperature is about 60°-80° C.

21. The process of claim 1 wherein the reactor pressure is 1-2000 about psig.

22. The process of claim 21 wherein the reaction pressure is about 40-100 psig.

23. The process of claim 1 wherein the hydrogen addition is carried out by adding to the polymer a material which releases hydrogen when it decomposes and causing said hydrogen-releasing material to decompose.

* * * * *